United States Patent [19]

Huehn

[11] Patent Number: 4,835,449
[45] Date of Patent: May 30, 1989

[54] SLIDING ROOF PANEL CONTROL APPARATUS

[75] Inventor: Werner T. Huehn, Milford, Mich.

[73] Assignee: ASC Incorporated, Southgate, Mich.

[21] Appl. No.: 46,699

[22] Filed: May 7, 1987

[51] Int. Cl.$^4$ .............................................. H02P 1/22
[52] U.S. Cl. .................................. 318/282; 318/467; 318/626
[58] Field of Search ............... 318/281, 282, 286, 467, 318/626, 663; 307/10 R

[56] References Cited

U.S. PATENT DOCUMENTS

| | | | |
|---|---|---|---|
| 4,070,607 | 1/1978 | Mitterer | 318/282 X |
| 4,329,594 | 5/1982 | Bohm | 318/282 X |
| 4,401,929 | 8/1983 | Odaka et al. | 318/266 X |
| 4,556,835 | 12/1985 | Vogel et al. | 318/663 |
| 4,621,223 | 11/1986 | Murakami et al. | 318/282 |
| 4,629,953 | 12/1986 | Inoue et al. | 318/286 X |
| 4,644,235 | 2/1987 | Ohta | 318/282 |

Primary Examiner—Benjamin Dobeck
Attorney, Agent, or Firm—Arnold S. Weintraub; Gerald R. Black

[57] ABSTRACT

A control apparatus for a sliding vehicle mounted roof panel controls the movement of the sliding roof panel between fully opened and fully closed positions within a window opening in the vehicle and predetermined intermediate, partially opened positions. The control apparatus includes a sensor for detecting the position of the sliding roof panel and a control apparatus, responsive to the output from the sensor, for activating or de-activating the drive motor controlling the movement of the sliding roof panel. A plurality of sensors may be spaced longitudinally along the longitudinal edge of the roof opening to provide a plurality of intermediate, partially opened stop positions for the sliding roof panel between the fully opened and fully closed positions.

5 Claims, 4 Drawing Sheets

SLIDING ROOF PANEL CONTROL APPARATUS

BACKGROUND OF THE INVENTION

1. Field of the Inventon

This invention relates, in general, to sliding roof panels for vehicles and, more specifically, to apparatus for controlling the movement of sliding roof panels in vehicles.

2. Description of the Prior Art

Sliding roof panels or "so-called" sunroofs are widely used in vehicles, such as automobiles. Such sliding roof panels movably open and close an opening formed in the roof of the vehicle.

A conventional sunroof includes a drive motor which mves drive cables connected to lifters attached to the sides of the sliding roof panel. Usually a control push button is operated by an occupant of the vehicle to activate the bi-directional motor to move the sunroof between a closed position and a fully opened position in which the sunroof panel is retracted beneath the rear stationary roof structure of the vehicle.

The roof panel can also be located by the driver at any partially open position merely by releasing the control push button when the panel is at the desired location. This requires timing, practice and selective positioning of the roof panel and, depending upon the driving speed of the vehicle, i.e. high, medium or slow, excessive wind noise and high quantities of air entering the vehicle may result in discomfort to the occupant(s).

Thus, it would be desirable to provide a control apparatus for a sliding roof panel which locates the sliding roof panel in any variety of different partially open positions within the roof opening depending upon the driving speed or the operator's preference. It would also be desirable to provide a control apparatus for a sliding roof panel which can easily be configured to automatically close the sliding panel when rain is sensed and the vehicle has stopped or the ignition is turned off.

SUMMARY OF THE INVENTION

The present invention is a control apparatus for a sliding roof panel in a vehicle, such as an automobile. The apparatus includes means for magnetically sensing the position of the sliding roof panel within the roof opening of the vehicle and control means, responsive to the position sensing means, for controlling the energization and de-energization of the drive means of the sliding roof panel.

A sensor, preferably a magnetically operated Hall effect switch is mounted at any pre-set location along the longitudinal length of the roof opening. The sensor detects the approach of a metal element of the sliding roof panel as it moves within the roof opening.

Preferably, a plurality of sensors are spaced along and mounted to the side of the roof opening at different positions to define several partially opened and stop positions for the sliding roof panel. The sensors are electrically connected to a control lever or push button mounted within the interior of the vehicle to enable the operator to select between the full open or full closed positions, as well as any intermediate, partially opened positions ther between.

The partially opened position of the sliding roof panel may be correlated to the speed of the vehicle, such as high, medium or slow vehicle speeds. This places the sliding roof panel in a desired, partially opened position for the current driving conditions of the vehicle thereby minimizing wind noise and providing more comfort for the occupants of the vehicle.

In one embodiment, a plurality of control levers are provided to enable the occupant to manually select the current condition under which he is or will be operating the vehicle. In another embodiment, an engine speed sensor is connected to the control circuit of this invention to automatically reposition the sliding roof panel within the roof opening depending upon the current driving speed of the vehicle without requiring occupant intervention.

Other features such as sensors detecting the onset of rain and/or the disconnection of the ignition of the vehicle may also be incorporated in the control apparatus of the present invention to automatically move the roof panel to the fully closed position when either or both of these conditions occur.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
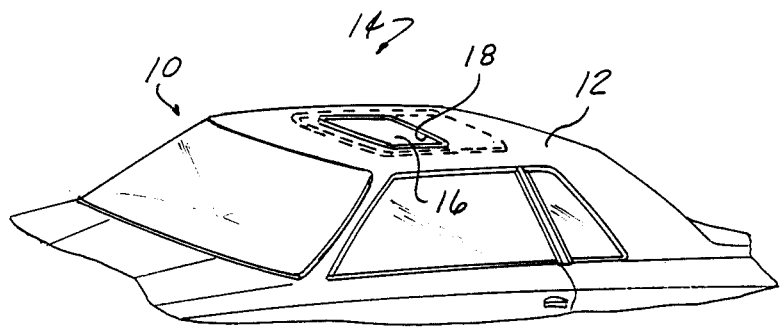
FIG. 1 is a perspective view of a vehicle on which the control apparatus of the present invention may be mounted.

Throughout the following description and drawing, an identical reference number is used to refer to the same component shown in multiple figures of the drawing.

Referring now to the drawing, and to FIG. 1 in particular, there is illustrated by way of an example a partial, perspective view of a conventional vehicle, such as an automobile, on which the control apparatus of the present invention may be advantageously employed. The vehicle 10 includes a stationary roof structure 12 having an internal sliding roof panel assembly 14 mounted therein. The sliding roof panel assembly 14 includes a roof panel 16 which is movably mounted within an opening 18 formed in the stationary roof structure 12 of the vehicle 10.

Figure 2:
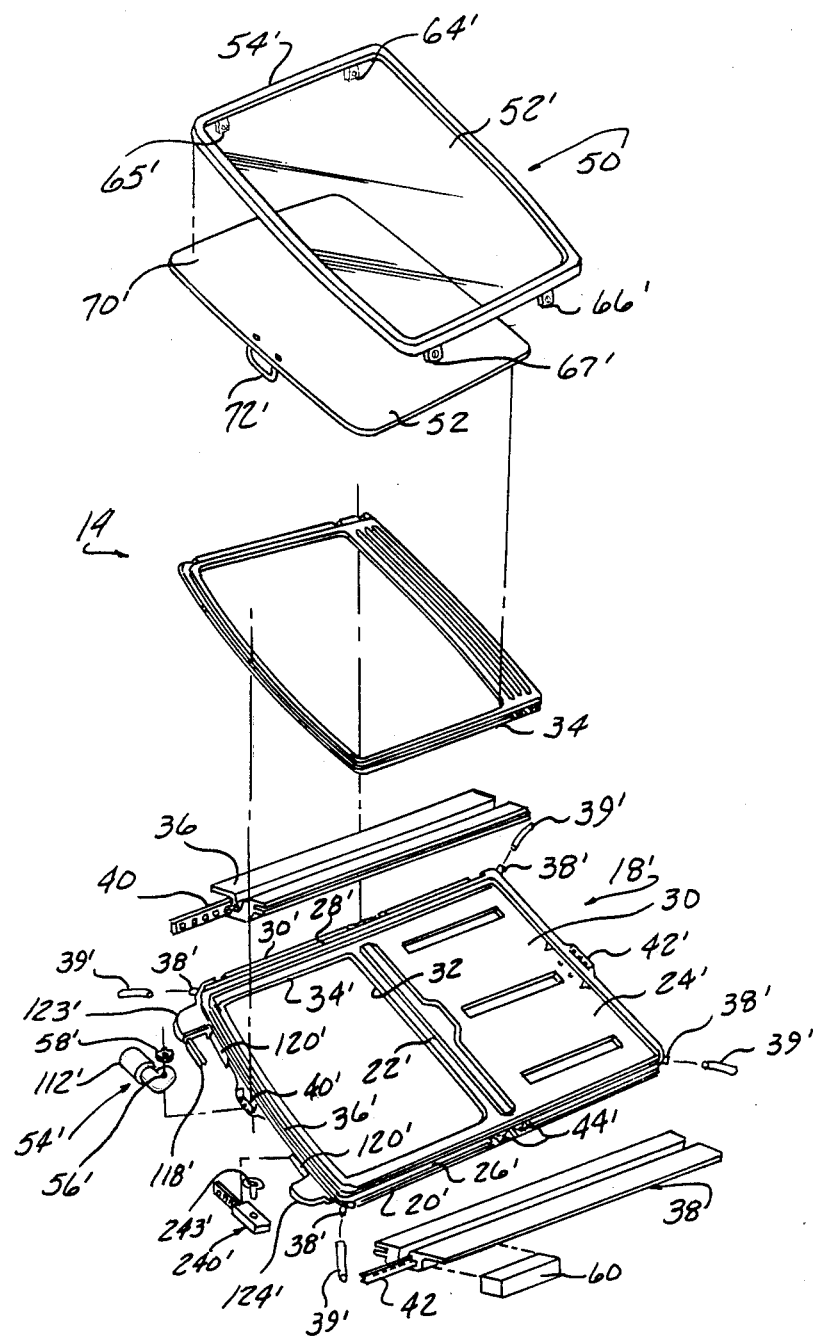
FIG. 2 is an exploded, perspective view showing a conventional sliding roof panel assembly with which the control apparatus of the present invention may be used.

Also by way of example and not limitation, a brief desription of a conventional sliding roof panel assembly will be provided in order to better present the advantageous uses of the control apparatus of the present invention. As shown in FIG. 2, the sliding roof panel apparatus 14 includes a housing 30 having an opening 32 formed therein corresponding in shape and positioned in registry with the opening 18 in the stationary roof structure of the vehicle 10. A reinforcing ring 34 is mountable about the roof opening 32 to provide additional support for the housing 30 when the housing 30 is mounted to the roof of the vehicle.

A pair of spaced guide tracks 36 and 38 are attached to the side edges of the housing 30. The guide tracks 36 and 38 are elongated and include internal channels which receive thrust transmitting cables or drive belts 40 and 42, respectively. Lifters, not shown, are attached to the drive belts or cables 40 and 42 to raise and lower the rear edge of the sliding roof panel 50, also shown in FIG. 2, as it moves between a first fully closed position in which it overlies the roof opening 18 and a retracted, fully opened, position in which it is located beneath the rear stationary roof structure 12 of the vehicle 10. A closure panel or sunscreen 52 may also be provided for sliding movement within the guide tracks 36 and 38 to close off the typically transparent sunroof or sliding roof panel 50 when disposed in the closed position.

The ends of the drive cables 40 and 42 which are movably disposed within the guide channels 36 and 38, respectively, are driven forward and rearward with respect to the housing 30 by a drive means 54. Preferably, the drive means 54 is a bi-directional electrical drive motor which has its output shaft 56 connected to a drive sprocket or gear 58 which engages the apertures in the drive belts 40 and 42 or the sides of the drive cables. Additional elements, such as drain troughs, alignment devices, etc., conventionally used in the construction of the sliding roof panel structures will not be described in detail for reasons of clarity. It will be understood, however, that any sliding sunroof assembly may be successfully employed with the control apparatus of the present invention.

Figure 3:
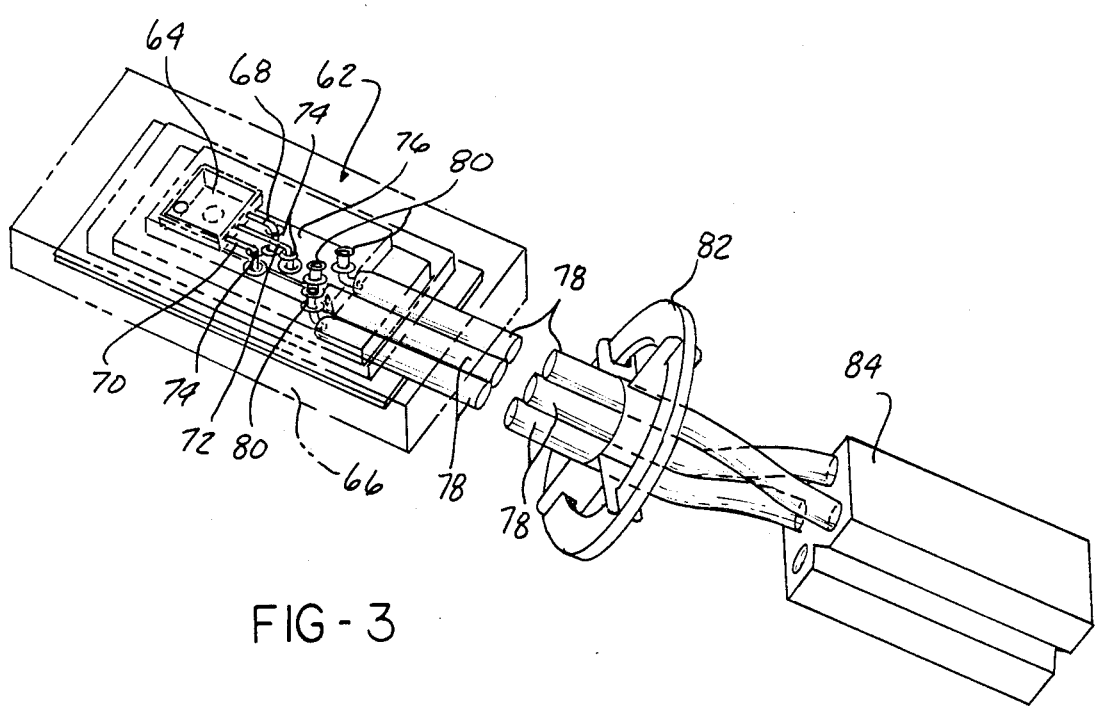
FIG. 3 is a perspective view of one of the sensors employed in the control apparatus.

Referring now to FIG. 3, there is illustrated a portion of the sensing apparatus 60 of the present invention. As seen in FIG. 3, the sensing apparatus 60 includes means 62 for sensing the longitudinal position of the sliding roof panel 50 within the housing 30. Preferably, the sensing means 62 is magnetically operative to detect proximity of a selected element or portion of the sliding roof panel 50 as the sliding roof panel 50 moves within the housing 30. In a preferred embodiment, the sensing means 62 is in the form of a Hall effect switch, such as the switch sold by Sprague Electric Company under model number UGN-3020T. This switch includes circuitry which magnetically detects the proximity of a metallic member, such as, in this case, a portion of the sliding roof panel 50, to a sensor head and generates an output indicating when the sliding panel 50 is in proximity with the sensing apparatus 60.

As shown in FIG. 3, the sensor 64 is mounted in a housing 66 and has three conductors 68, 70 and 72 which extend outward thereof. The ends of the conductors 68, 70 and 72 are connected by terminals 74 to leads or terminal strips 76 mounted in the housing 66. Connecting wires 78 extend through one end of the housing and are connected by terminals 80 to the leads 76.

A clamp or grommet 82 is connected around the connecting wires 78 to maintain the correcting wires 78 in close proximity. The opposite ends of the connecting wires 78 are attached to a suitable connector or terminal block 84 representatively shown in FIG. 3. This allows connection of the sensor 64 to the remainder of the sensing apparatus 60 as described hereafter.

In operation, at least one sensing apparatus 60 is mounted to one of the guide rails 36 or 38 as shown in FIG. 2 with the sensor 64 facing the movable portions of the sliding roof panel assembly 14. In a preferred embodiment a plurality of sensing apparatus 60 are mounted at distinct, spaced positions along the length of the roof opening 18 in the vehicle 10. The three distinct positions may be selected to enable any desired positioning of the roof panel 50 or can be correlated to the desired operating conditions or speed of the vehicle to provide distinct partially opened positions of the sliding roof panel 50 to prevent the inrush of excessive amounts of air into the interior of the vehicle 10 or objectional wind noise. For example, at high speeds when wind noise is at a high level and air flow into the vehicle is fast, a small, partially opened position may be pre-set for the sliding roof panel 50 within the roof opening 18 to minimize the amount of air entering the vehicle by mounting a sensing apparatus 60 a short distance from the forward edge of the window opening 18. Alternate spaced positions may also be selected for medium and slow driving speeds in which, respectively, the sliding roof panel 50 is moved to larger open positions from the forward edge of the opening 18 thereby exposing more of the window opening 18 to the environment.

Figure 4A:
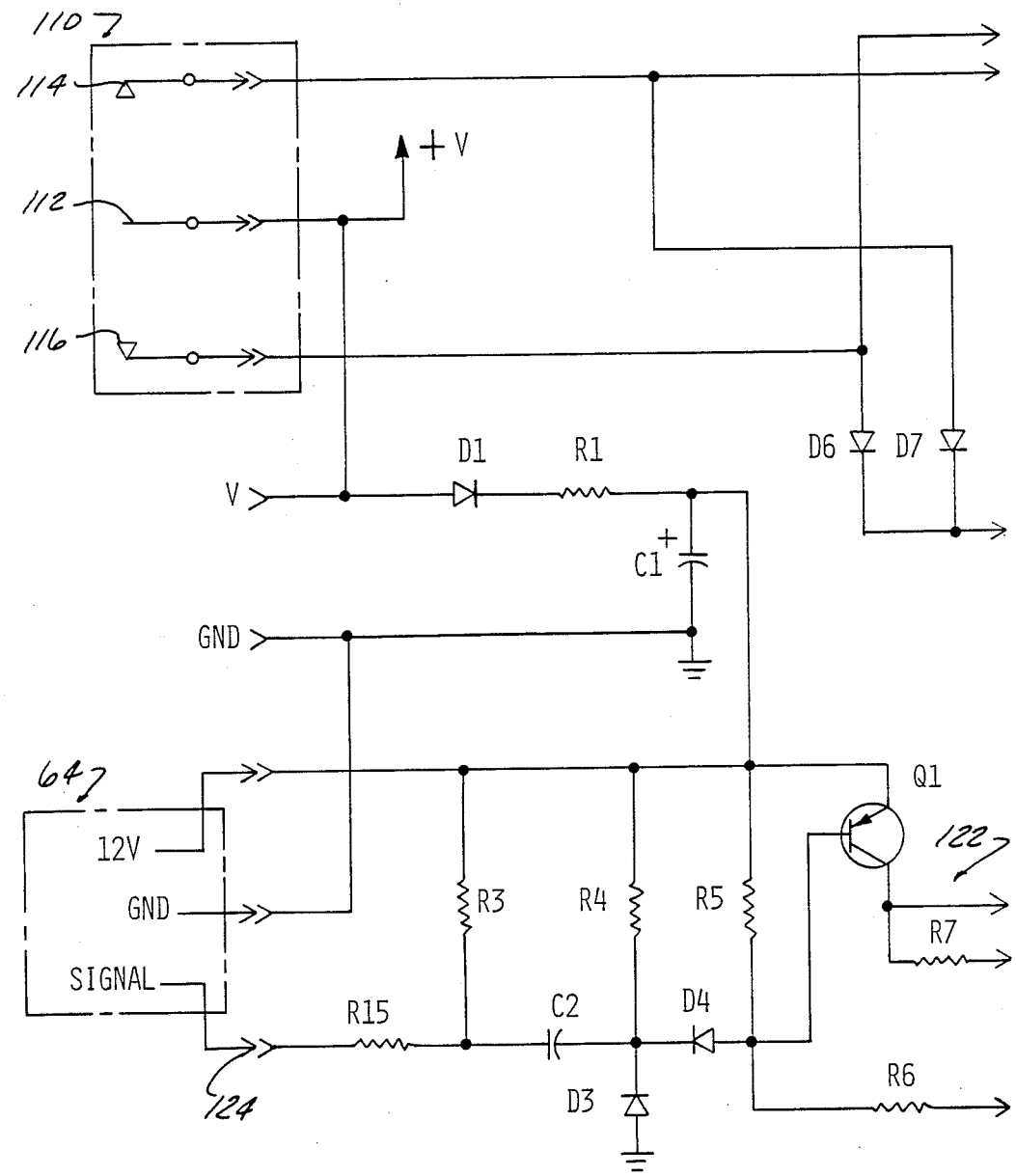
FIGS. 4A and 4B are circuit diagrams of the sensing apparatus.
Figure 4B:
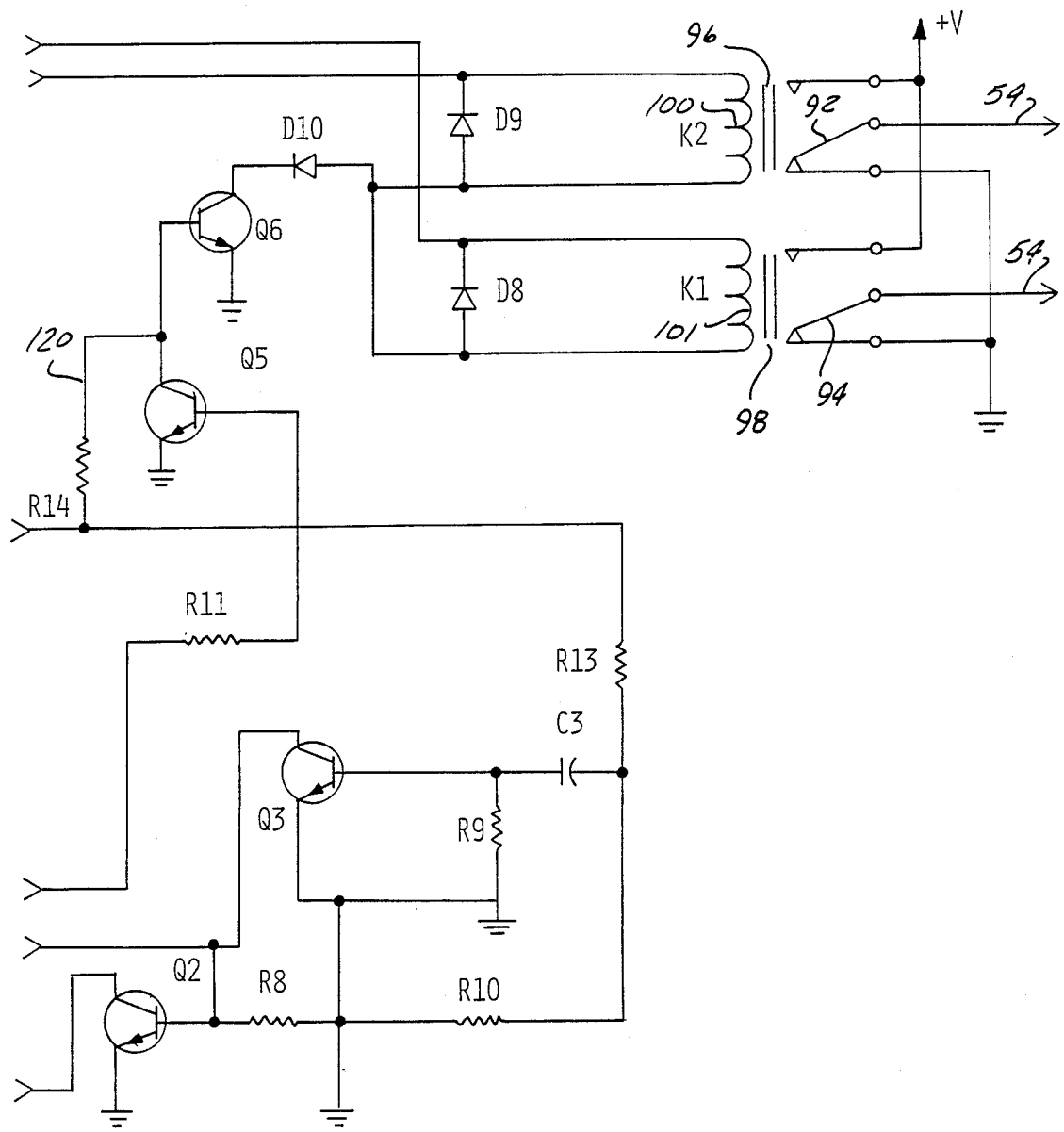

Referring now to FIG. 4, there is shown a circuit for use in the sensing apparatus 60 which may be employed to selectively move the sliding roof panel 50 between various pre-set or occupant selected positions within the roof opening 18. As shown in FIG. 4B, the drive means or motor 54 has its power leads connected to switchable contacts 92 and 94 each controlled by electro-mechanical relays 96 and 98, respectively, in a preferred embodiment of the invention. A contact switch is movable between a grounded position and an electrically conductive position upon activation of the coils 100 and 101 of either of the relays 96 and 98, respectively, to apply electrical power in a bi-directional manner to the motor 54, thereby driving it in alternating directions depending upon the direction of movement of the roof panel 50 desired by the operator of the sensing apparatus 60.

The vehicle 10 is also provided with a switch means 110 symbolically shown in FIG. 4a which enables the operator to select the desired position of the sliding roof panel 50. The switch 110 may be constructed in any form, such as separate opened and closed switches, or as shown in FIG. 4B, in a toggle-switch configuration with a neutral or central non-conductive position. Depression of the switch 110 moves a contact 112 to a first position denoted by reference number 114 which applies power to the relay 96 thereby driving the motor 54 in one direction. Moving the switch 110 in the opposite direction urges the contact 112 into engagement to a second position 116 thereby applying electrical power through the other relay 98 reversing electrical power the motor 54 and its direction of rotation. In this manner, the operator can control both the forward and rearward movement of the sliding roof panel 50 between fully opened and fully closed positions and any number of intermediate, partially opened portions depending upon the location of the sensors 60.

Drivers 120 for the relays 96 and 98 are provided in the circuit. Also, amplification circuitry is provided, as shown in general by reference number 122, for the low voltage switch 64 whose output signal on line 124 disables the relays 96 and 98 when the sliding roof panel 50 has moved into close proximity with the sensor 64. In this manner, pre-set positions for mounting of one or more sensing apparatus 60 along the longitudinal extent of thereof opening 18 enables the sliding roof panel 50 to be moved and stopped at the various, desired positions.

The exact locations in which the sliding roof panel 50 can be positioned are selectable in a variety of ways. In one version, an occupant of the vehicle may engage a single control lever or switch 110 which can be cycled to a first open position and then recycled repeatedly until the sliding roof panel 50 is in the desired partially opened or fully opened position. Alternately, a plurality of separate input switches may be connected in the circuit shown in FIG. 4A in conjunction with the respective sensor 64 and the control lever 110 to enable a desired position to be selected by the operator for the desired position of the sunroof.

It is also possible with minor modifications to the circuitry shown in FIG. 4 to place the control apparatus in an automatic mode. This can be accomplished by attaching a conventional speed sensor, such as a tachometer or transducer, to the engine of the vehicle thereby obtaining a speed output signal(s) when the engine has reached a pre-set speed. This can be input through the circuitry shown in FIGS. 4A and 4B to energize the relays 96 and 98 and actuate the drive motor 54 to move the roof panel 50 to a different position depending upon the driving condition or speed of the vehicle 10.

Finally, alternate sensors may be employed, such as a rain sensor or an ignition shut-off switch in conjunction with the above-identified circuitry, to automatically move the roof panel 50 to the fully closed position upon the sensing of rain or excessive amounts of moisture, i.e. rain, dew, when the vehicle is stopped or the ignition is shut off.

In summary, there has been disclosed a unique control apparatus for a sliding roof panel mounted in a vehicle which uniquely enables the position of the sliding roof panel to be placed in several different locations along the length of the roof opening in the vehicle depending upon the operator's choice or upon the driving conditions of the vehicle, such as high speed, medium speed or slow speed.

What is claimed is:

1. A roof panel for a sliding roof panel movably disposed within a stationary housing within a roof opening of a vehicle, the roof panel comprising:

a plurality of mangetically operative position sensors disposed along the length of the stationary housing of the vehicle for sensing the position of the sliding roof panel relative to the vehicle, the sensors determining the longitudinal position of the sliding roof panel by detecting the proximity of a metal portion of the sliding roof panel as the sliding roof moves within the housing, wherefrom an output signal is generated which indicates when the sliding panel is in the proximity thereof;

drive means for moving the sliding roof panel within the roof opening between a fully open position, a plurality of partially opened positions, and a fully closed position, the drive means being bi-directional; and control means, cooperating with the magnetic position sensors of the sliding roof panel, for controlling the energization and de-energization of the drive means to cause the repositioning of the sliding roof panel in response to the position selected by the operator.

2. The roof panel of claim 1, wherein the drive means is a bidirectional drive motor.

3. The roof panel of claim 1, wherein the positioning sensing means comprises a Hall effect switch.

4. The roof panel of claim 3, wherein the control means is responsive to the Hall effect which for controlling the energization and de-energization of the drive means at selected positions within the roof opening in the vehicle.

5. The roof panel of claim 1, wherein the control means includes a manual mode which enables the sliding roof panel to be repositioned relative to the vehicle in response to a request by an operator, and the control means includes an automatic mode which enables the sliding roof panel to be automatically repositioned relative to the vehicle in response to an external condition.

* * * * *